United States Patent [19]

Yamashita

[11] Patent Number: 4,601,561
[45] Date of Patent: Jul. 22, 1986

[54] AUTOMATIC HOUSING TYPE ELECTRONIC FLASHLIGHT DEVICE OF A FOLDING TYPE CAMERA

[75] Inventor: Yoshimi Yamashita, Tokyo, Japan

[73] Assignee: Fuji Photo Film Co., Ltd., Tokyo, Japan

[21] Appl. No.: 655,027

[22] Filed: Sep. 26, 1984

[30] Foreign Application Priority Data

Oct. 30, 1983 [JP] Japan .......................... 58-151516[U]

[51] Int. Cl.$^4$ ...................... G03B 15/05; G03B 17/04
[52] U.S. Cl. ............................... 354/149.11; 354/193
[58] Field of Search ............... 354/126, 145.1, 149.11, 354/187, 192, 193

[56] References Cited

U.S. PATENT DOCUMENTS

| | | | |
|---|---|---|---|
| 4,231,645 | 11/1980 | Davis et al. | 354/145.1 |
| 4,389,110 | 6/1983 | Pizzuti | 354/126 |
| 4,452,519 | 6/1984 | Fraser et al. | 354/187 |
| 4,452,520 | 6/1984 | Kaplan | 354/187 |

Primary Examiner—A. A. Mathews
Attorney, Agent, or Firm—Pasquale A. Razzano

[57] ABSTRACT

An automatic housing type electronic flashlight device of a folding type camera comprises an electronic flashlight tube positioned in a cutaway portion near a base end of a front cover supported on a swing shaft parallel with a film supporting face of a camera body. The electronic flashlight tube is supported on a rotation shaft parallel with the swing shaft so that it is rotatable between an operating position where a light emission face thereof is projected from the cutaway portion and a housed position. The electronic flashlight tube is urged toward the operating position by an urging member engaged with a pin projecting laterally from the electronic flashlight tube. A cam plate is secured to slide members supported for sliding along the front cover so that the pin is pushed by the cam plate and the electronic flashlight tube is rotated thereby to the housed position when the slide members are moved from the front end side to the base end side of the front cover.

6 Claims, 10 Drawing Figures

AUTOMATIC HOUSING TYPE ELECTRONIC FLASHLIGHT DEVICE OF A FOLDING TYPE CAMERA

BACKGROUND OF THE INVENTION

1. Field of the Invention

This invention relates to an electronic flashlight device mounted on a folding type camera adapted to be folded compact.

2. Description of the Prior Art

In cameras such as instant cameras wherein large films are used and the distance between the lens and the film face must be adjusted comparatively long, a need exists for adapting the cameras to be folded so that the lens mounting section comes close to the film face and the cameras can be carried easily. Therefore, various folding configurations have heretofore been employed for the instant cameras. However, in the conventional folding type cameras, a part thereof projects outwardly even in the folded condition. Thus the conventional folding type cameras are inconvenient for carrying, for example, in a thin bag.

Accordingly, in a co-pending U.S. Patent Application, the applicant proposed a folding type camera comprising:

(i) a front cover which is fabricated of a front plate standing face to face with an opening in a front face of a camera body and a pair of side plates joined respectively with side end portions of said front plate, and which is supported on the camera body for swinging around a swing shaft positioned in parallel with a film supporting face of the camera body in the vicinity of end portions of said side plates, (ii) rotatable levers each having one end portion supported on the camera body for rotation around a rotation shaft parallel with said swing shaft, and an engagement boss positioned near the other end portion for engagement with a guide groove in each of said side plates so that, as said front cover is swung, said rotatable levers are rotated and said engagement bosses enter introducing portions at end portions of said guide grooves, thereby maintaining said front cover in a predetermined swung position (photograph taking position) where said opening is opened, (iii) slide members supported for sliding along said side plates in the direction approximately normal to said swing shaft and engaged with the vicinity of the other end portions of said rotatable levers so that, when said front cover is swung to said predetermined swung position, said slide members are pushed by said rotatable levers moving in engagement with said front cover and are slid away from said swing shaft, (iv) slide member locking mechanisms for locking said slide members at predetermined slid positions when said front cover is swung up to said predetermined swung position, and (v) a shutter board for supporting a photograph taking lens, said shutter board being supported at front end portions of said slide members for rotation around a rotation shaft parallel with said swing shaft so that, when said front cover is opened up to said photograph taking position, said shutter board is rotated to a rotated position where said photograph taking lens becomes parallel to the film supporting face of the camera body.

When the front cover is swung to close the opening in the front face of the camera body, the slide members are slid toward the swing shaft side (i.e. the base end side) of the front cover along the side plates thereof. At this time, the shutter board supported at the front end portions of the slide members are rotated to a rotated position where the shutter board is approximately parallel with the front cover. As the slide members are slid toward the base end side of the front cover, the shutter board is pulled by the slide members and is slid to the inside of the front cover. Accordingly, after the front cover is closed, nothing projects outwardly of the front cover. Thus the camera is folded into an almost flat shape.

In order to incorporate an electronic flashlight tube in the folding type camera as described above such that the camera be compact, a cutaway portion should preferably be positioned near the base end portion of the front cover for incorporating the electronic flashlight tube therein. However, in the case where the electronic flashlight tube is positioned near the base end portion of the front cover with the light emission face thereof facing front, the electronic flashlight tube projects outwardly of the front cover when the front cover is closed, and the advantage of the folding type camera is lost. When a popping-up configuration as used heretofore in the electronic flashlight device of the type incorporated in the camera is employed, it is possible to house the electronic flashlight tube inside of the front cover when the camera is folded. In this case, however, complicated camera operations are required.

SUMMARY OF THE INVENTION

The primary object of the present invention is to provide an automatic housing type electronic flashlight device which is automatically housed inside of the front cover when the camera is folded.

Another object of the present invention is to provide an automatic housing type electronic flashlight device which facilitates operation of the folding type camera.

The present invention provides an automatic housing type electronic flashlight device of a folding type camera including:

(i) a front cover supported, near a base end portion thereof, on a swing shaft parallel with a film supporting face of a camera body for swinging between a position where said front cover closes an opening of a front face of the camera body and a photograph taking position where said front cover opens said opening, (ii) slide members supported for sliding along said front cover in the direction approximately normal to said swing shaft, (iii) a shutter board provided with a photograph taking lens and supported at front end portions of said slide members for rotation around a rotation shaft parallel with said swing shaft, and (iv) rotatable levers each having one end portion supported on the camera body for rotation around a rotation shaft parallel with said swing shaft, and engaged near the other end portion with said front cover and each of said slide members so that, when said front cover is swung toward said photograph taking position, said rotatable levers are rotated in engagement with said front cover to make said slide members slide from the base end side of said front cover to an front end side thereof, the automatic housing type electronic flashlight device comprising:

(a) an electronic flashlight tube positioned in a cutaway portion near said base end portion of said front cover and supported for rotation around a rotation shaft parallel with said swing shaft of said front cover so that said electronic flashlight tube is rotated between an operating position where a light emission face of said electronic flashlight tube is projected from said cutaway portion outwardly of said front cover so as to face front and a housed position where said light emission face is housed inside of said front cover, (b) an urging means for urging said electronic flashlight tube toward said operating position, (c) a pin projecting laterally from said electronic flashlight tube, and (d) a cam plate secured to said slide members for pushing said pin against urging force of said urging means and rotating said electronic flashlight tube up to said housed position when said slide members are slid from the front end side of said front cover to the base end side thereof.

When the camera is folded, the electronic flashlight device of the present invention is automatically housed inside of the front cover. Therefore, the electronic flashlight tube does not projects from the front cover, and the camera can be folded almost flat. Also, since the electronic flashlight device of the present invention is automatically adjusted to the operating position when the camera is set to the photograph taking condition, the folding type camera becomes easy to operate.

DESCRIPTION OF THE PREFERRED EMBODIMENTS

The present invention will hereinbelow be described in further detail with reference to the accompanying drawings.

Figure 2:
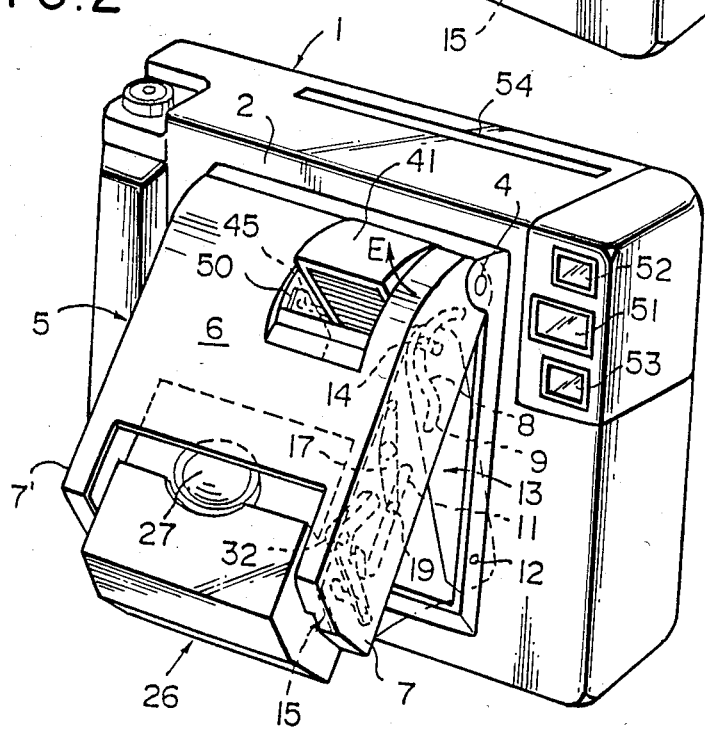
Figure 3:
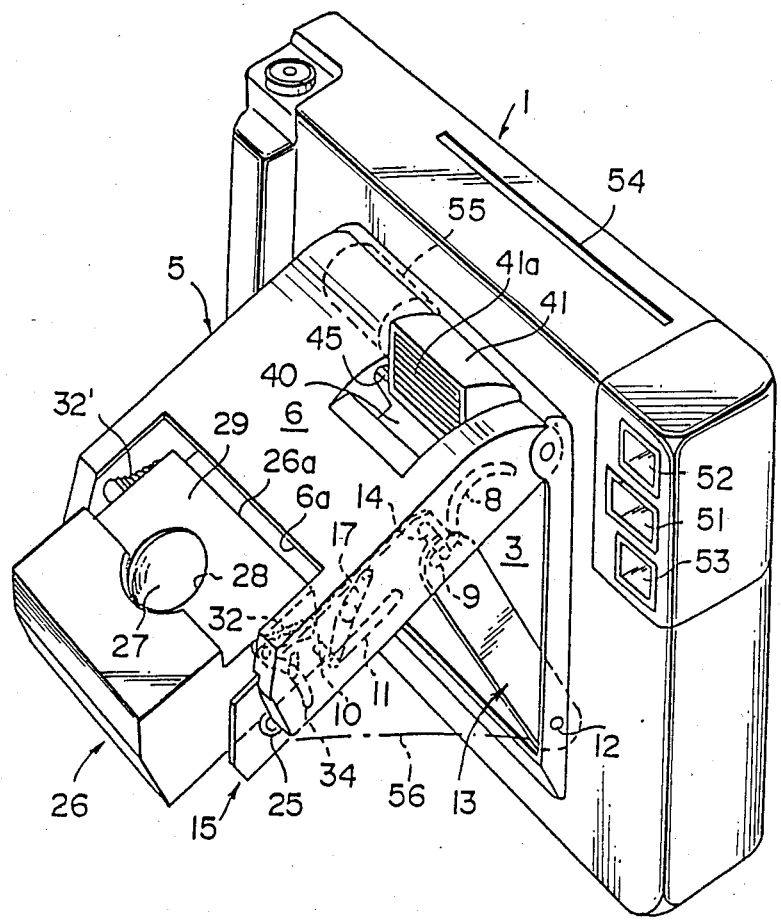
Figure 4:
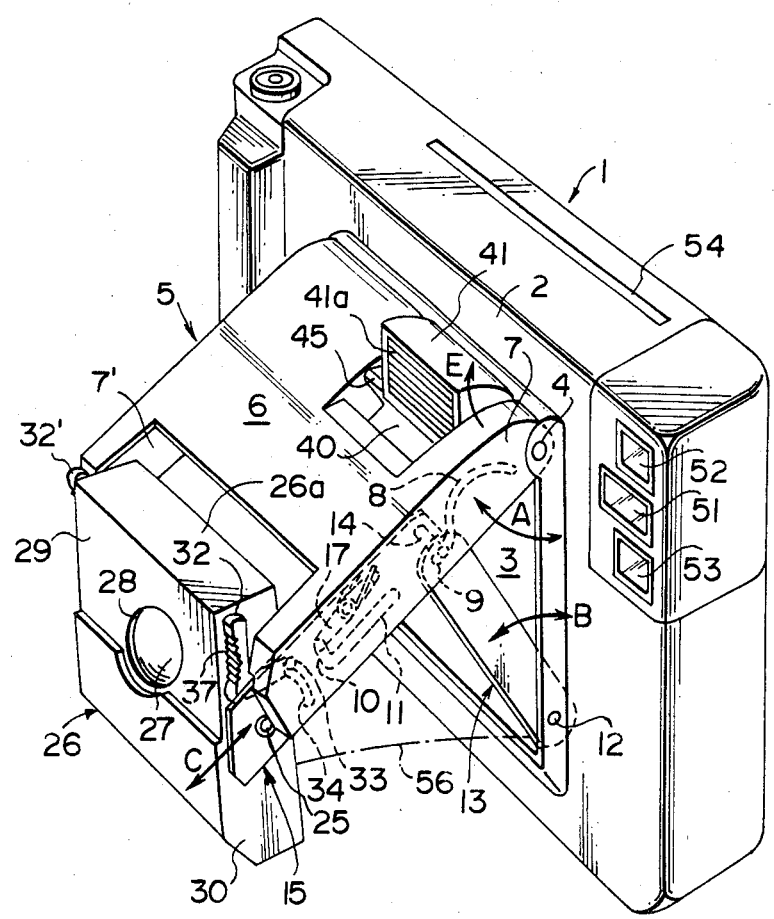
Figure 5:
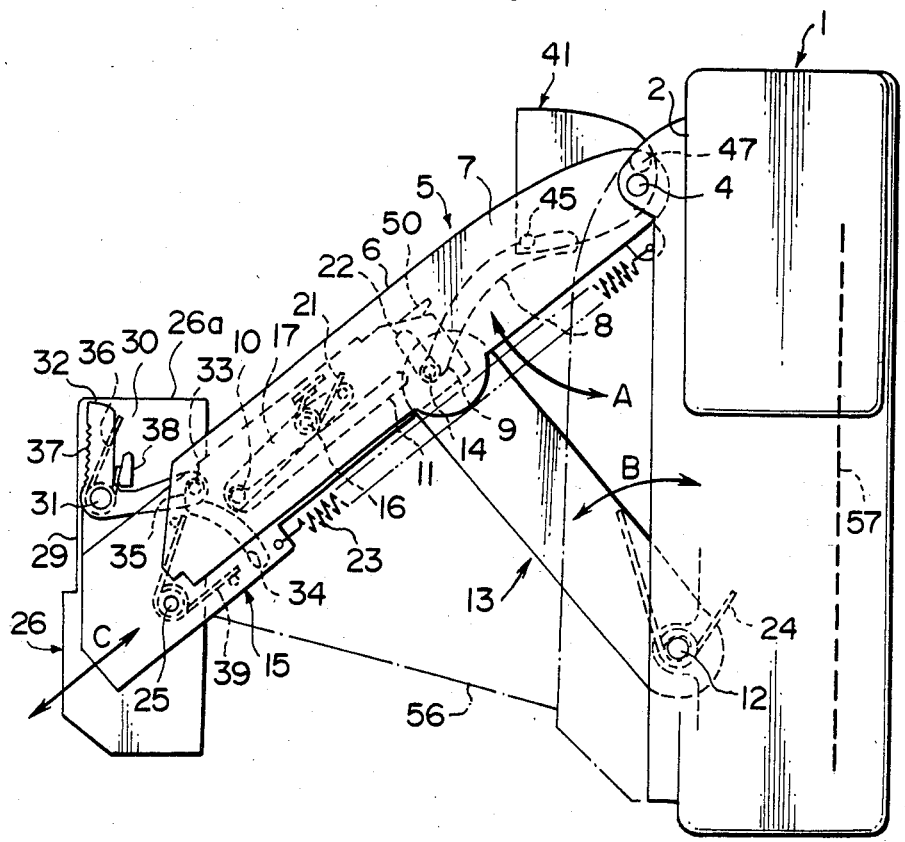
FIG. 5 is a side view showing the folding type camera in the photograph taking condition.

FIGS. 1 to 4 sequentially show from the folded condition to the photograph taking condition of a folding type camera in which an embodiment of the automatic housing type electronic flashlight device in accordance with the present invention is incorporated, and FIG. 5 is a side view showing the folding type camera in the photograph taking condition. The present invention is described below mainly with reference to FIGS. 4 and 5. By way of example, the folding type camera is an instant camera using a self-processing photographic film. As shown in FIG. 4, an opening 3 for passing light to which a film is exposed is positioned in a front face 2 of a camera body 1. The opening 3 is opened and closed by a front cover 5 swingable around a swing shaft 4. The front cover 5 has an approximately U-shaped cross-section and is fabricated of a front plate 6 adapted for standing face to face with the opening 3, side plates 7 and 7' joined respectively to the right and left side ends of the front plate 6. One end portion of each of the side plates 7 and 7' (i.e. the upper end portion thereof in FIG. 5) is supported on a swing shaft 4 which is parallel with a film supporting face 57 of the camera body 1 as shown in FIG. 5 and which extends in the width direction of the camera body 1, so that the front cover 5 is swingable in the direction as indicated by the arrow A. The inner surface of the side plate 7 is provided with an arc-like guide groove 8 convex to the front plate 6, and an end portion of the guide groove 8 on the front end side of the front cover 5 constitutes an introducing portion 9 extending in the longitudinal direction of the side plate 7. Also, the inner surface of the side plate 7 between the guide groove 8 and the front end of the front cover 5 is provided with a sliding guide groove 11 extending in the longitudinal direction of the side plate 7. An end portion of the sliding guide groove 11 on the front end side of the front cover 5 is bent toward the front plate 6 to constitutes an introducing portion 10.

On the camera body 1 near the lower end portion of the opening 3, there is a rotatable lever 13 supported at one end (lower end) thereof on a rotation shaft 12 parallel with the swing shaft 4 so that the rotatable lever 13 can be rotated in the direction as indicated by the arrow B. An engagement boss 14 the end portions of which are projected inwardly and outwardly from the rotatable lever 13 is secured to the vicinity of the other end (upper end) of the rotatable lever 13. The rotatable lever 13 is positioned inside of the side plate 7, and the outwardly projecting portion of the engagement boss 14 is engaged with the guide groove 8 of the side plate 7. Therefore, when the front cover 5 is swung to open the opening 3, the engagement boss 14 secured to the rotatable lever 13 is moved in the guide groove 8, and the rotatable lever 13 is rotated so that the upper end thereof moves away from the opening 3.

Figure 6:
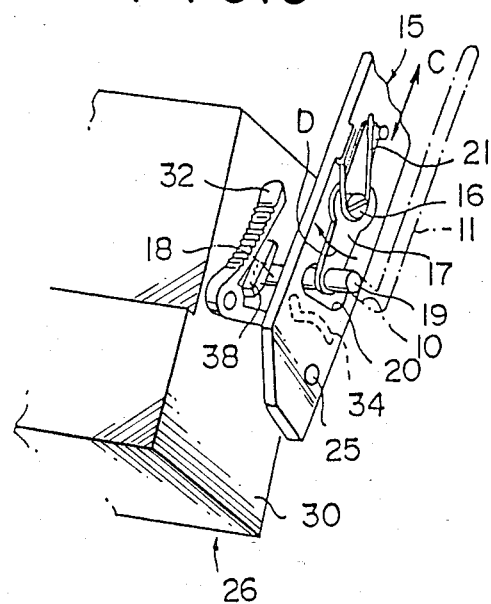
FIGS. 6 and 7 are perspective views showing a part of the folding type camera.
Figure 7:
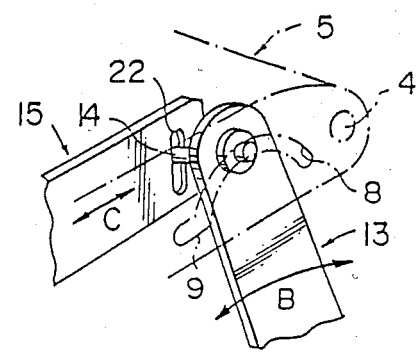

A slide member 15 fabricated, for example, in a plate-like shape, is positioned inside of the side plate 7. As shown in FIG. 6, on the surface of the slide member 15 facing the side plate 7, a lock lever 17 is mounted for rotation around a rotation shaft 16 secured to the slide member 15 normal to the side plate 7. The lock lever 17 is provided with a pin 18 which is positioned at an end portion thereof on the front end side of the slide member 15 and which projects outwardly (toward the side plate 7) and inwardly. The outwardly projecting portion of the pin 18 constitutes a guide boss 19, and the inwardly projecting portion thereof extends through an opening of the slide member 15 up to inside of the slide member 15. The guide boss 19 engages with the sliding guide groove 11 of the side plate 7 so that the slide member 15 can be guided by the sliding guide groove 11 and is slid in the longitudinal direction of the side plate 7 as indicated by the arrow C. By a torsion spring 21 positioned around the rotation shaft 16, the lock lever 17 is urged in the direction as indicated by the arrow in FIG. 6 so that the guide boss 19 enters the introducing portion 10 of the sliding guide groove 11. As shown in FIG. 7, in the vicinity of the rear end portion of the slide member 15, a long hole 22 extending approximately normal to the longitudinal direction of the slide member 15 is positioned for engagement with the inner end portion of the engagement boss 14 of the rotatable lever 13. Accordingly, when the front cover 5 is swung and the rotatable lever 13 is rotated thereby in the direction as indicated by the arrow B, the slide member 15 is moved forwardly and backwardly in the direction as indicated by the arrow C.

As shown in FIG. 5, the slide member 15 is engaged with one end of a coil spring 23 the other end of which is engaged with the front cover 5. The slide member 15 is urged by the coil spring 23 toward the base end side of the front cover 5. On the other hand, the rotatable lever 13 is urged by a torsion spring 24 positioned around the rotation shaft 12 such that the upper end portion of the rotatable lever 13 moves away from the opening 3.

On the inner side of the front end portion of the slide member 15, there is supported a shutter board 26 which is rotatable around a rotation shaft 25 parallel with the swing shaft 4 and which is urged by a torsion spring 39 counter-clockwise in FIG. 5. A photograph taking lens 27 is supported at the center of the shutter board 26. The rotation shaft 25 is adjusted so that, when the shutter board 26 is in the housed position parallel with the front cover 5 as shown in FIG. 3, a front face 29 provided with an opening 28 for positioning the lens 27 therein is positioned inner (i.e. closer to the opening 3) than the front plate 6.

Figure 1:
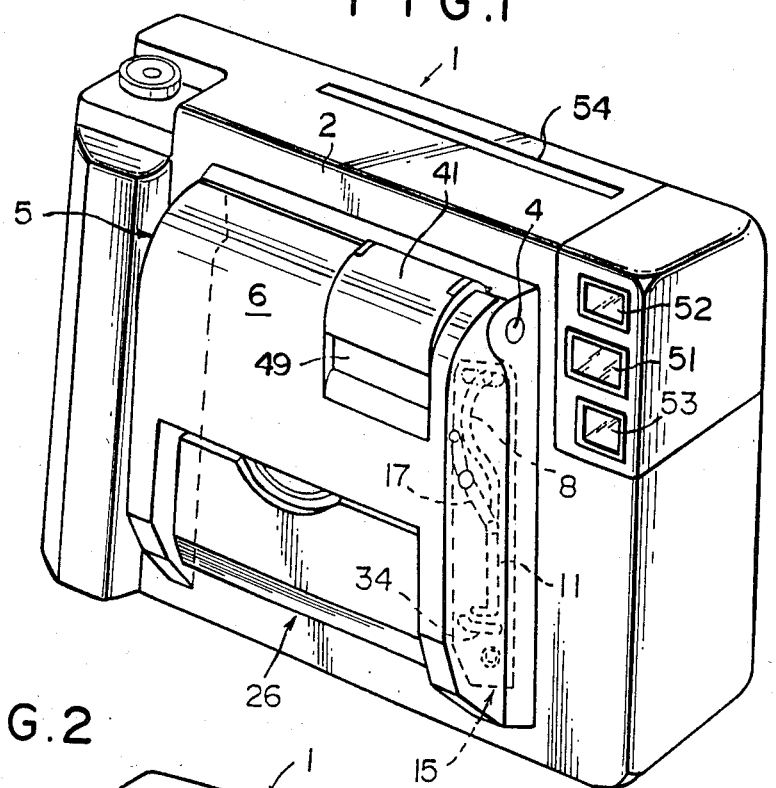
FIGS. 1 to 4 are perspective views sequentially showing from the folded condition to the photograph taking condition of a folding type camera in which an embodiment of the electronic flashlight device in accordance with the present invention is incorporated.

The sliding range of the slide member 15 in the direction as indicated by the arrow C is adjusted such that, when the front cover 5 is opened up to the maximum swung position, i.e. up to the photograph taking position, and the shutter board 26 is in the aforesaid housed position as shown in FIG. 3, an upper end 26a of the shutter board 26 is slightly spaced forwardly away from a front end edge 6a of the front plate 6. Also, the sliding range of the slide member 15 is adjusted such that, when the shutter board 26 is in the aforesaid housed position and the front cover 5 is in the swung position where the opening 3 is closed, i.e. in the folded position, as shown in FIG. 1, the front face disappears inside of the front plate 6 and the lens 27 in the opening 28 is positioned closer to the base end of the front cover 5 than is the front end edge 6a of the front plate 6.

On a side face 30 of the shutter board 26, an engagement lever 32 fabricated, for example, in the L-shaped form is mounted for rotation around an engagement lever rotation shaft 31 parallel with the swing shaft 4. To one end portion of the engagement lever 32 is secured an engagement boss 33 projecting laterally therefrom, i.e. toward the slide member 15. The engagement boss 33 is engaged with a guide groove 34 positioned in the inner surface of the slide member 15. The guide groove 34 has an arc-like shape adapted to guide the shutter board 26 rotating around the rotation shaft 25 and is provided with an introducing portion 35 at an end portion closer to the front plate 6. The engagement lever 32 is urged by a torsion spring 36 positioned around the rotation shaft 31 so that the engagement boss 33 enters the introducing portion 35. The other end portion of the engagement lever 32 constitutes a toothed pushing portion 37. To the side face 30 of the shutter board 26 is secured a lock releasing contact member 38 for supporting one end of the torsion spring 36. The position of the contact member 38 is adjusted such that, when the shutter board 26 is rotated clockwise around the rotation shaft 25 in FIG. 5, the contact member 38 moves by the side of the introducing portion 10.

The elements as described above are also positioned in the same manner on the side of the side plate 7' standing face to face with the side plate 7. The elements on the side of the side plate 7' are designated by attaching a mark ' to the numerals denoting the elements positioned on the side of the side plate 7.

Figure 8:
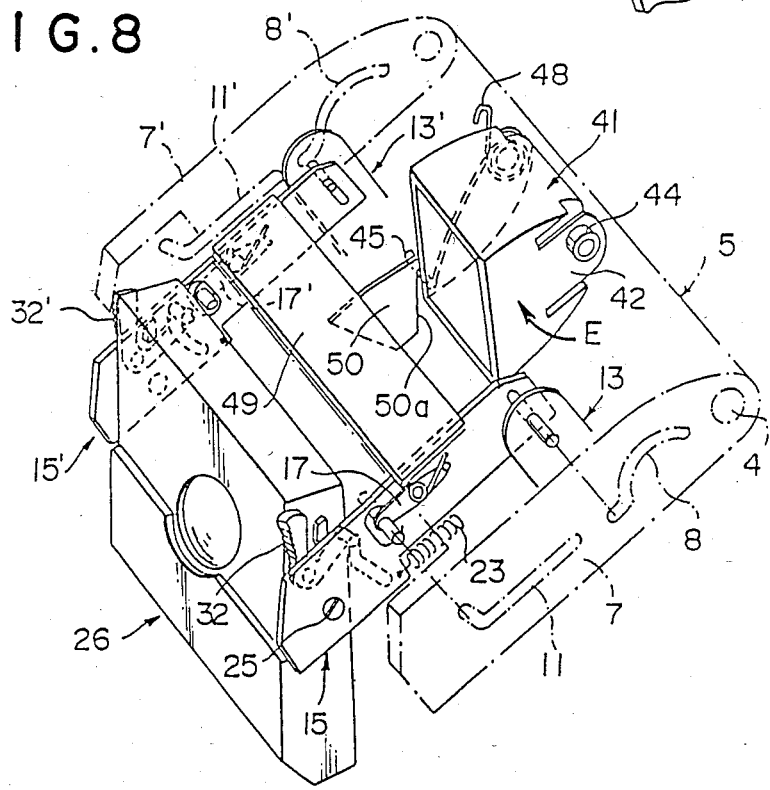
FIGS. 8 and 9 are perspective views showing the embodiment of the electronic flashlight device in accordance with the present invention when the folding type camera is set to the photograph taking condition and the folded condition.
Figure 9:
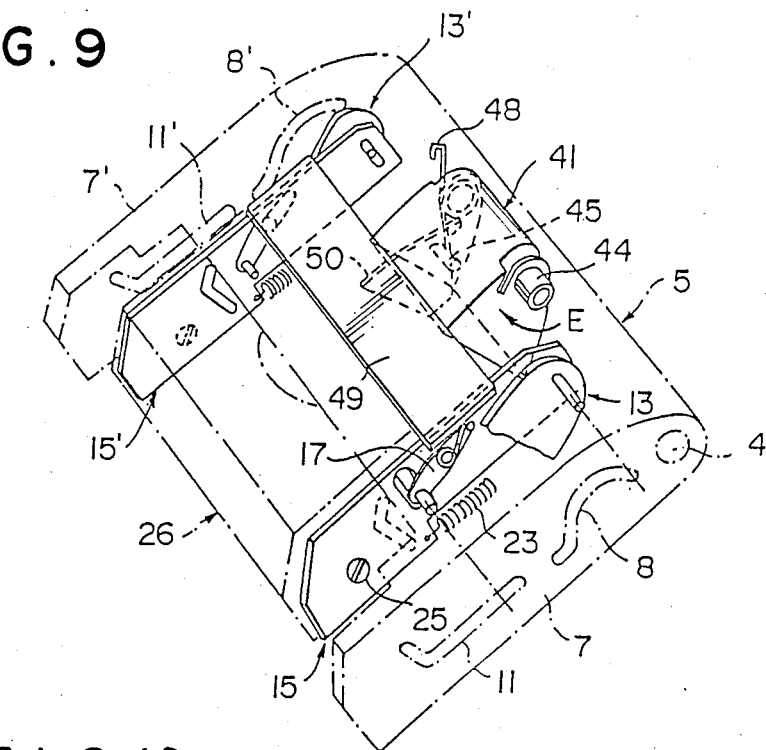
Figure 10:
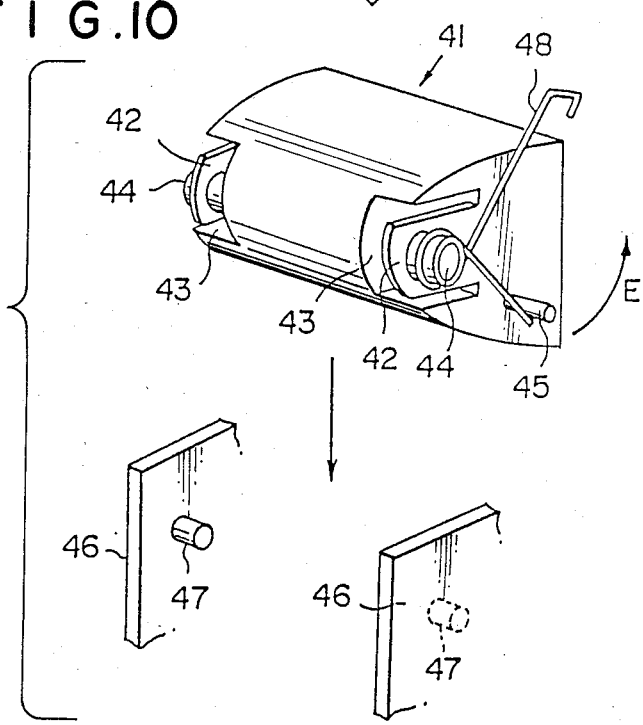
FIG. 10 is an enlarged perspective view showing a part of the embodiment of the electronic flashlight device in accordance with the present invention.

A cutaway portion 40 is positioned at the base end portion of the front plate 6 of the front cover 5, and an electronic flashlight tube 41 is positioned within the cutaway portion 40. FIGS. 8 and 9 show the mechanism around the electronic flashlight tube 41 when the camera is set to the photograph taking condition and the folded condition. The electronic flashlight tube 41 and the mechanism related thereto will hereinbelow be described with reference to FIGS. 8 and 9. In FIGS. 8 and 9, for simplicity of explanation, the positions of the side plates 7 and 7' of the front cover 5 are shifted outwardly from their actual positions. As shown in detail in FIG. 10, the electronic flashlight tube 41 is provided with a pair of parallel notches inside of side plates 42, 42 of the electronic flashlight tube body. The notches have open ends so that spaces 43, 43 are formed inside of the side plates 42, 42. Cylindrical engagement shafts 44, 44 for supporting the electronic flashlight tube 41 on the front cover 5 are secured to the side plates 42, 42, and a pin 45 is projected from one of the side plates 42. Also, as shown in FIG. 10, a pair of supporting plates 46, 46 spaced away from each other are secured to the front cover 5 for supporting the electronic flashlight tube 41, and supporting shafts 47, 47 are projected from the supporting plates 46, 46 to stand face to face with each other. By way of example, the body of the electronic flashlight tube 41, including the side plates 42, 42, is integrally fabricated of a plastic material, so that side plates 42, 42 are resiliently bent towards the spaces 43, 43. When the electronic flashlight tube 41 is mounted on the front cover 5, the side plates 42, 42 are manually pushed and bent towards the spaces 43, 43, and the electronic flashlight tube 41 is inserted into the front cover 5 until the engagement shafts 44, 44 stand face to face with the supporting shafts 47, 47 of the supporting plates 46, 46. When the side plates 42, 42 are released in this condition, they resiliently return outwardly, and the engagement shafts 44, 44 fit to the supporting shafts 47, 47. In this manner, the electronic flashlight tube 41 is mounted on the front cover 5 so that it can be rotated around the supporting shafts 47, 47.

Further, a torsion spring 48 is applied to one of the engagement shafts 44, 44. One end of the torsion spring 48 is engaged with the pin 45, and the other end thereof is engaged with the front cover 5, thereby urging the electronic flashlight tube 41 in the direction as indicated by the arrow E so that it projects from the cutaway portion 40 outwardly of the front plate 6.

As shown in FIGS. 8 and 9, end portions of a protective plate 49 are joined to the end faces of the slide members 15 and 15' on the side of the front plate 6. When the slide members 15 and 15' are slid, the protective plate 49 is slid along the inner surface of the front plate 6. To the center of the protective plate 49 is secured a cam plate 50 extending inwardly of the front cover 5. The cam plate 50 is secured so that it comes into contact with the pin 45 of the electronic flashlight tube 41 mounted on the front cover 5. A cam face 50a of the cam plate 50 coming into contact with the pin 45 is obliquely formed so that the end of the cam face 50a farther from the front plate 6 is closer to the front end side of the front cover 5 than is the end thereof near the front plate 6.

As shown in FIG. 5, the supporting shafts 47, 47 around which the electronic flashlight tube 41 is rotated are positioned farther from the optical axis of the photograph taking lens 27 than are the swing shaft 4 of the front cover 5.

Also, as shown in FIGS. 1 to 4, the camera body 1 is provided with a view finder positioned by the side of the upper portion of the front cover 5. Distance measuring windows 52 and 53 of an auto focusing mechanism are positioned above and below the view finder 51. Since the view finder 51 is positioned between the distance measuring windows 52 and 53, it is possible to adjust the base length between the distance measuring windows 52 and 53 sufficiently long and still to gather the three components compact. Further, as shown in FIG. 3, a motor 55 for driving the spreading rollers (not shown) which are used for spreading a processing liquid of a self-processing photographic film within the image forming area and for ejecting the film from an outlet 54 is positioned by the side of the electronic flashlight tube 41 by efficiently utilizing the space in the front cover 5. In the camera wherein the film is ejected upwardly, the spreading rollers are positioned at the upper portion of the camera body 1. Therefore, when the motor 55 is positioned as shown, it becomes possible to simplify the driving force transmission mechanism between the motor 55 and the spreading rollers. A light shielding member 56 such as bellows or a shade for shielding the photograph taking optical system from light is positioned between the shutter board 26 and the camera body 1.

Operations and effects of the folding type camera constructed as described above will hereinbelow be described. When the front cover 5 is folded to the swung position (folded position) at which the opening 3 is closed as shown in FIG. 1, the engagement boss 14 of the rotatable lever 13 is positioned near the upper end of the guide groove 8 of the side plate 7, and the rotatable lever 13 is at the rotated position approximately parallel with the side plate 7. (The mechanisms on the side of a rotatable lever 13' operate in the same manner as those on the side of the rotatable lever 13. Therefore, only the mechanisms on the side of the rotatable lever 13 are described below.) At this time, the slide member 15 is positioned inside of the front cover 5 as described later, and the shutter board 26 is positioned approximately parallel with the front cover 5 with its front face 29 positioned inside of the front plate 6. The electronic flashlight tube 41 is in the housed position such that the light emission face 41a disappears inside of the front cover 5 and the outer surface of the electronic flashlight tube 41 approximately matches the outer surface of the front plate 6.

When the side plates 7 and 7' are then grasped and the front cover 5 is swung so that the front end portion moves away from the camera body 1, the engagement boss 14 moves within the guide groove 8 toward the front end of the front cover 5 as shown in FIG. 2, and the rotatable lever 13 moves so that the upper end portion separates away from the camera body 1. Also, the slide member 15 the long hole 22 of which is engaged with the engagement boss 14 is pushed by the rotatable lever 13, and the guide boss 19 of the lock lever 17 is slid within the sliding guide groove 11 toward the front end of the front cover 5. As a result, the shutter board 26 supported on the slide member 15 comes out of the front cover 5 toward the front end thereof. Further, the cam plate 50 pushing the pin 45 as shown in FIG. 9 is moved away from the pin 45 as the slide member 15 is moved, and the electronic flashlight tube 41 urged by the torsion spring in the direction as indicated by the arrow E rotates in this direction so that it projects from the cutaway portion 40. When the front cover 5 is near the folded position, the urging force of the torsion spring 24 is comparatively large, and the urging force of the coil spring 23 is comparatively small. Therefore, the operation of opening the front cover 5 from the folded position is assisted by the torsion spring 24 and is effected easily.

As shown in FIG. 3, when the front cover 5 is further opened, the rotatable lever 13 is rotated until the engagement boss 14 enters the introducing portion 9 at the end of the guide groove 8. At this stage, the front cover 5 is prevented by the engagement boss 14 from rotating further and is fixed and supported at the predetermined swung position (photograph taking position). Also, as shown in FIG. 6, the guide boss 19 of the lock lever 17 urged by the torsion spring 21 enters the introducing portion 10 at the end of the sliding guide groove 11, and the slide member 15 is fixed at the predetermined slid position. At this time, the upper end 26a of the shutter board 26 is separated forwardly from the front end edge 6a of the front plate 6. Therefore, as shown in FIG. 5, the engagement boss 33 of the engagement lever 32 is slid within the guide groove 34, and shutter board 26 urged by the torsion spring 39 is rotated so that the upper end 26a faces up exactly. When the shutter board 26 is thus positioned upright and the engagement boss 33 of the engagement lever 32 is moved up to the upper end portion of the guide groove 34, the engagement lever 32 urged by the torsion spring 36 is rotated so that the engagement boss 33 enters the introducing portion 35 at the end of the guide groove 34. Therefore, the shutter board 26 is prevented from rotating and fixed at the upright position in which the photograph taking lens 27 in parallel with the film supporting face 57 of the camera body 1 as shown in FIGS. 4 and 5. At this time, the electronic flashlight tube 41 is projected up to the operating position in which the light emission face 41a faces forwardly as shown in FIG. 8. Further, since the supporting shafts 47, 47 around which the electronic flashlight tube 41 is rotated is positioned higher than the swing shaft 4 as shown in FIG. 5, the light emission face 41a is sufficiently spaced away from the optical axis of the photograph taking lens 27, and a red-eye phenomenon does not arise. The portion of the front plate 6 under the cutaway portion 40 is formed obliquely so that the wall thickness decreases toward the cutaway portion 40. Therefore, light emitted from the light emission face 41a is not intercepted by the front plate 6.

As described above, the folding type camera is set from the folded condition to the photograph taking condition by a single operation. When the camera is then folded from the photograph taking condition, the pushing portion 37 of the engagement lever 32 is pushed toward the front plate 6 against the torsion spring 36. As a result, the engagement lever 32 is rotated clockwise in FIG. 5 around the rotation shaft 31, and the engagement boss 33 is disengaged from the introducing portion 35 of the guide groove 34. When the pushing portion 37 is further pushed, the engagement lever 32 contacts the lock releasing contact member 38, and therefore the shutter board 26 is rotated around the rotation shaft 25 against the torsion spring 39. At this time, the engagement boss 33 of the engagement lever 32 moves within the guide groove 34. Just before the shutter board 26 becomes parallel with the front plate 6, the lock releasing contact member 38 pushes the pin 18 of the lock lever 17. When the shutter board 26 becomes parallel with the front plate 6, the pin 18 is disengaged from the introducing portion 10. Then, the slide member 15 urged by the coil spring 23 is slid within the front cover 5 toward the base end side of the front cover 5 together with the shutter board 26 while the guide boss 19 of the lock lever 17 is guided by the sliding guide groove 11. As a result, the rotatable lever 13 the engagement boss 14 of which is engaged with the long hole 22 of the slide member 15 is pushed by the slide member 15 and rotated clockwise in FIG. 5. Therefore, the engagement boss 14 of the rotatable lever 13 is disengaged from the introducing portion 9 of the side plate 7 and moved upwardly within the guide groove 8, so that the front cover 5 is swung in the direction closing the opening 3. In the photograph taking condition as shown in FIG. 5, the urging force of the coil spring 23 is comparatively large, and the urging force of the torsion spring 24 is comparatively small. Therefore, the front cover 5 can be readily swung by the force of the coil spring 23 toward the folded position against the urging force of the torsion spring 24.

Accordingly, when the front cover 5 is slightly pushed toward the camera body 1, the front cover 5 is moved to the folded position where it closes the opening 3.

When the shutter board 26 is moved toward the base end side of the front cover 5 together with the slide member 15, the front face 29 of the shutter board 26 disappears inside of the front plate 5. Thus the photograph taking lens 27 supported by the front face 29 is covered and protected by the front cover 5.

As the slide member 15 is moved toward the base end side of the front cover 5, the cam face 50a of the cam plate 50 secured to the protective plate 49 joined with the slide member 15 gradually pushes down the pin 45. Therefore, the electronic flashlight tube 41 is rotated counterclockwise in FIG. 5 around the supporting shafts 47, 47. When the front cover 5 is folded completely, the light emission face 41a disappears inside of the front plate 6. Accordingly, nothing projects outwardly of the front cover 5, and the camera is folded almost flat. Also, when the slide member 15 is moved as described above, the protective plate 49 moves to a position nearly contacting the electronic flashlight tube 41, and closes the cutaway portion 40 in which the electronic flashlight tube 41 is positioned. Therefore, as shown in FIG. 9, the light emission face 41a of the electronic flashlight tube 41 disappears inside of the protective plate 49 and is protected thereby. When the front cover 5 is thereafter opened, the protective plate 49 is moved toward the front end side of the front cover 5 and opens the cutaway portion 40 as the slide member 15 is moved. At this time, since the cam plate 50 is moved away from the pin 45, the electronic flashlight tube 41 urged by the torsion spring 48 is projected from the cutaway portion 40.

In the aforesaid embodiment, the cam plate 50 is secured to the protective plate 49 joined with the slide members 15 and 15'. However, the cam plate 49 may be secured to the inner surface of the slide member 15, or a cam face may be directly formed on the inner surface of the slide member 15. Also, instead of fabricating the side plates 42, 42 of the electronic flashlight tube 41 integrally with the body of the electronic flashlight tube 41, the side plates 42, 42 may be fabricated of a resilient plate material independetly of the body of the electronic flashlight tube 41 and secured, for example, by screws to the body of the electronic flashlight tube 41. Further, in the aforesaid embodiment, the rotatable lever 13 and the slide member 15 are engaged with each other by the engagement of the engagement boss 14 of the rotatable lever 13 with the long hole 22 of the slide member 15. However, it is also possible to engage them by positioning an engagement boss on the slide member 15 and an engagement hole in the rotatable lever 13.

I claim:

1. An automatic housing type electronic flashlight device of a following type camera including:
   (i) a front cover having a base end portion and being supported near said base end portion on a swing shaft parallel with a film supporting face of a camera body for swinging between a position where said front cover closes an opening of a front face of the camera body and a photograph taking position where said front cover opens said opening,
   (ii) slide members supported for sliding along said front cover in the direction approximately normal to said swing shaft,
   (iii) a shutter board provided with a photograph taking lens and supported at front end portions of said slide members for rotation around a rotation shaft parallel with said swing shaft, and
   (iv) rotatable levers each having one end portion supported on the camera body for rotation around a rotation shaft parallel with said swing shaft, and engaged near the other end portion with said front cover and each of said slide members so that, when said front cover is swung toward said photograph taking position, said rotatable levers are rotated in engagement with said front cover to make said slide members slide from the base end side of said front cover to a front end side thereof, the automatic housing type electronic flashlight device comprising:
   (a) an electronic flashlight tube positioned in a cutaway portion near said base end portion of said front cover and supported for rotation around a rotation shaft parallel with said swing shaft of said front cover so that said electronic flashlight tube is rotated between an operating position where a light emission face of said electronic flashlight tube extends away from said cutaway portion outwardly of said front cover so as to face front and a housed position where said light emission face is housed inside of said front cover,
   (b) an urging means for urging said electronic flashlight tube toward said operating position,
   (c) a pin projecting laterally from said electronic flashlight tube, and
   (d) a cam plate secured to said slide members for pushing said pin against urging force of said urging means and rotating said electronic flashlight tube to said housed position when said slide members are slid from the front end side of said front cover to the base end side thereof.

2. An automatic housing type electronic flashlight device as defined in claim 1 wherein said electronic flashlight tube is provided with resilient side plates, and spaces are formed inside of said resilient side plates so that said resilient side plates are bent toward said spaces when said electronic flashlight tube is mounted in said cutaway portion of said front cover.

3. An automatic housing type electronic flashlight device as defined in claim 2 wherein engagement shafts for rotatable engagement with said front cover are secured to outer surfaces of said resilient side plates.

4. An automatic housing type electronic flashlight device as defined in claim 3 wherein said urging means is a torsion spring applied around one of said engagement shafts, one end of said torsion spring is engaged with said pin, and the other end thereof is engaged with said front cover.

5. An automatic housing type electronic flashlight device as defined in claim 1 wherein said cam plate is secured to a protective plate which is joined with said slide members and which covers said light emission face when said electronic flashlight tube is rotated to said housed position.

6. An automatic housing type electronic flashlight device as defined in claim 1 wherein said rotation shaft around which said electronic flashlight tube is rotatable is positioned higher than said swing shaft on which said front cover is supported.

* * * * *

UNITED STATES PATENT AND TRADEMARK OFFICE
CERTIFICATE OF CORRECTION

PATENT NO. : 4,601,561

DATED : July 22, 1986

INVENTOR(S) : Yoshimi Yamashita

It is certified that error appears in the above-identified patent and that said Letters Patent is hereby corrected as shown below:

On the cover page at item [30], the Foreign Priority Data,

"October 30, 1983 [JP]" is changed to --September 30, 1983 [JP]--.

Signed and Sealed this

Eleventh Day of November, 1986

*Attest:*

DONALD J. QUIGG

*Attesting Officer*    *Commissioner of Patents and Trademarks*